United States Patent Office 2,892,751
Patented June 30, 1959

2,892,751
HALOALKENYL PHOSPHOROTHIOATES

George A. Saul, Nitro, W. Va., assignor to Monsanto Chemical Company, St. Louis, Mo., a corporation of Delaware No Drawing. Application April 25, 1956
Serial No. 580,457

10 Claims. (Cl. 167—22)

This invention relates to new organic compounds of phosphorus and to the methods whereby such products are formed.

The new compounds comprise neutral esters of a thiophosphoric acid having a halogen substituted olefinic ester group attached to oxygen or sulfur and two other ester groups linked to oxygen. Such compounds may be represented by the structure:

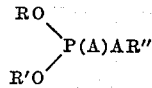

where R and R' represent organic radicals, as for example alkyl, alkenyl, aryl, aralkyl and alicyclic radicals. These radicals may also be substituted. Examples comprise phenyl, p-chlorophenyl, 2,4-dichlorophenyl, ethyl, propyl, butyl, amyl, hexyl, octyl, allyl, chloroallyl, methoxyethyl, ethoxyethyl, benzyl and cyclohexyl radicals. A represents oxygen or sulfur, at least one of which is sulfur and R'' is a halogen substituted alkenyl group.

The new compounds exert marked biological activity. The preferred class comprise the structure:

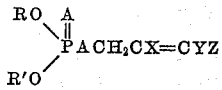

where R and R' represent lower alkyl groups, one A represents sulfur and the other oxygen, X and Y represent hydrogen or halogen, at least one being halogen, and Z represents methyl, hydrogen or halogen. Of the halogens, fluorine, chlorine and bromine are preferred.

The compounds of this invention may be prepared by reacting a haloolefin with a salt of a phosphorothioic acid. The following examples illustrate in detail the preparation and properties of some of the new products but are not to be taken as limitative.

Example 1

A 3-necked flask, fitted with a stirrer, a thermometer, a dropping funnel and a reflux condenser, was charged with 58.8 parts by weight (0.3 mole) of O,O-diethyl phosphorodithioic acid of 95.3% purity. To this was added, at a maximum temperature of 30° C., 107.0 parts by weight (0.3 mole) of a 19.16% solution of sodium ethylate in ethanol. Next was added in approximately five minutes, at a temperature below 20° C., 27.8 parts by weight (0.25 mole) of 2,3-dichloropropene (B. 91–94° C.), the reaction mixture heated to 80–83° C. and heating continued for about four hours. The salt which precipitated as a very fine suspension was removed by filtration and the product then stripped of alcohol to 100° C. at 20 mm. absolute pressure. The residual oil so obtained was dissolved in approximately 200 ml. of heptane and then given three successive 200 ml. washes with 5% sodium carbonate solution and two 200 ml. washes with water. On removal of the heptane to 105° C. at 20 mm. 56.8 parts by weight (87% yield) of S-(2-chloroallyl) O,O-diethyl phosphorodithioate was obtained as a light brown liquid. Analysis gave 12.2% phosphorus, 24.0% sulfur and 12.3% chlorine as compared to 11.9% phosphorus, 24.5% sulfur and 13.6% chlorine calculated for $C_7H_{14}ClO_2PS_2$.

Example 2

In the procedure of Example 1, 1,3-dichloropropene was substituted for the 2,3-dichloropropene. The reaction mixture was refluxed for 9 hours, added to water to dissolve the fine suspension of salt which formed and to separate out the product. The separated crude product was dissolved in 150 ml. of heptane and washed with sodium carbonate solution and water as in Example 1. The washed heptane solution of the product was stripped of solvent to 125° C. at 15 mm. to yield 62.8 parts by weight (96.4% yield) of S-(3-chloroallyl) O,O-diethyl phosphorodithioate. The hazy light brown liquid product was filtered through Attapulgus clay for clarification. Analysis gave 12.9% phosphorus, 25.5% sulfur and 12.0% chlorine as compared to 11.9% phosphorus, 24.5% sulfur and 13.6% chlorine calculated for $$C_7H_{14}ClO_2PS_2$$

Example 3

In this example, 34.4 parts by weight (0.275 mole) of 1,3-dichloro-2-butene was substituted for the 2,3-dichloropropene of Example 1. The reaction mixture was heated very rapidly to 81° C. and held there with stirring for approximately 20 hours. It was then quenched with water, dissolved in 200 ml. of benzene and washed with sodium carbonate solution and water as before. The solvent was removed by stripping to 100° C. at 8 mm. and 75 parts by weight (99% yield) of S-(3-chloro-2-butenyl) O,O-diethyl phosphorodithioate obtained. After filtering through clay, it was a clear brown liquid analyzing 12.5% chlorine, 12.0% phosphorus and 23.1% sulfur as compared to 12.9% chlorine, 11.3% phosphorus and 23.3% sulfur calculated for $C_8H_{16}ClO_2PS_2$.

Example 4

To 26.9 parts by weight (0.185 mole) of 1,1,3-trichloropropene in acetone was added 37.4 parts by weight (0.2 mole) of ammonium O,O-diethyl phosphorothioate 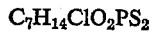 at a temperature of 21–23° C. Over the next half hour the reaction mixture was heated to 57° C. and held at 57–60° C. for four and one-half hours. The acetone was then removed by stripping to a pot temperature of 91° C. and the product quenched with water. After the usual washes including the step of dissolving in benzene, the solvent was stripped to 91° C. at 15–17 mm. The 3,3-dichloroallyl O,O-diethyl phosphorothioate was obtained as a brown liquid in 80% theory yield. Analysis gave 27.7% chlorine and 10.4% phosphorus as compared to 25.4% chlorine and 11.1% phosphorus calculated for $C_7H_{13}Cl_2O_3PS$.

Example 5

The procedure of Example 4 was employed using 33.7 parts by weight (0.232 mole) of 1,1,3-trichloropropene in acetone solution and 43.7 parts by weight (0.25 mole) of ammonium O,O-dimethyl phosphorodithioate. The reaction mixture was heated to refluxing temperature and held at 58–60° C. for six hours. The S-(3,3-dichloroallyl) O,O-dimethyl phosphorodithioate was obtained as a brown liquid analyzing 12.7% phosphorus as compared to 11.6% calculated for $C_5H_9Cl_2O_2PS_2$.

Example 6

A mixture of 43.5 parts by weight (0.3 mole) of 1,1,3-trichloropropene in 110 ml. of acetone and 71.2 parts by weight (0.35 mole) of ammonium O,O-diethyl phosphorodithioate was heated to 60–66° C. and maintained at this temperature for seven and one-half hours. After standing overnight at room temperature, the product was isolated as described in Example 4. The S-(3,3-dichloroallyl) O,O-diethyl phosphorodithioate was obtained as a brown liquid. Analysis gave 10.7% phosphorus and 22.3% chlorine as compared to 10.5% phosphorus and 24.0% chlorine calculated for $C_7H_{13}Cl_2O_2PS_2$.

Example 7

Replacing ammonium O,O-diethyl phosphorodithioate of Example 6 with an equal molecular weight of ammonium O,O-diisopropyl phosphorodithioate, the mixture was heated to 50–60° C. and maintained at this temperature for seven hours. After standing at room temperature overnight, the acetone was removed by stripping. The product was then washed with aqueous sodium carbonate and water and dried by heating to 100° C. at 20 mm. The S-(3,3-dichloroallyl) O,O-diisopropyl phosphorodithioate, a clear brown liquid, was obtained in 81.7% theory yield. Analysis gave 9.4% phosphorus and 23.3% chlorine as compared to 9.6% phosphorus and 22.0% chlorine calculated for $C_9H_{17}Cl_2O_2PS_2$.

Example 8

The mixture consisted of 33.3 parts by weight (0.3 mole) of 2,3-dichloropropene in 120 ml. of acetone and 65.6 parts by weight (0.35 mole) of ammonium O,O-diethyl phosphorothioate. These materials were heated to 60–66° C. and maintained at this temperature for seven hours. After standing overnight, the product was again heated to 66° C. and held at this temperature for two hours. The acetone was removed by stripping, the product quenched, washed with aqueous sodium carbonate and water and restripped to 100° C. at 35 mm. The 2-chloroallyl O,O-diethyl phosphorothioate was obtained as a brown liquid in 80.3% yield. Analysis gave 12.3% phosphorus and 12.8% chlorine as compared to 12.7% phosphorus and 14.5% chlorine calculated for $C_7H_{14}ClO_3PS$. Infrared analysis showed that the P=O group was present.

Example 9

In the procedure of Example 8, trans-1,2,3-trichloropropene was substituted for the 2,3-dichloropropene. The materials were heated at 66° C. for 2 hours and reheated and held at this temperature for three hours the following day before isolating as described. The 2,3-dichloroallyl O,O-diethyl phosphorothioate, a dark brown liquid, was obtained in 81.5% theory yield. Analysis gave 11.1% phosphorus as compared to 11.1% calculated for $C_7H_{13}Cl_2O_3PS$. Infrared analysis showed the presence of the P=O group.

Example 10

To a solution of 43.5 parts by weight (0.3 mole) of 1,1,3-trichloropropene in 220 ml. of acetone was added at 25° C. 90.7 parts by weight (0.35 mole) of ammonium O,O-dibutyl phosphorodithioate. The mixture was heated rapidly to 60° C. and held at this temperature for six hours. After standing overnight, the acetone was stripped off, the product quenched with water and washed with aqueous sodium carbonate and water as described hereinbefore. The product was dried by heating to 115° C. at 20 mm. to yield S-(3,3-dichloroallyl) O,O-dibutyl phosphorodithioate as a brown liquid in 77.2% theory yield. Analysis gave 9.1% phosphorus and 20.2% chlorine as compared to 8.8% phosphorus and 20.2% chlorine calculated for $C_{11}H_{21}Cl_2O_2PS_2$.

Example 11

In the procedure of Example 10, ammonium O,O-dipropyl phosphorodithioate was substituted for the dibutyl compound. The materials were heated seven hours at 60° C. and then isolated as described. The S-(3,3-dichloroallyl) O,O-dipropyl phosphorodithioate, a clear brown liquid, analyzed 9.3% phosphorus and 22.8% chlorine as compared to 9.6% phosphorus and 22.0% chlorine calculated for $C_9H_{17}Cl_2O_2PS_2$.

Example 12

The mixture consisted of 33.3 parts by weight (0.3 mole) of 1,3-dichloropropene in 120 ml. of acetone and 65.6 parts by weight (0.35 mole) of ammonium O,O-diethyl phosphorothioate. The reactants were heated and stirred as described in Example 10. The 3-chloroallyl O,O-diethyl phosphorothioate, a dark brown liquid, was obtained in 92.2% theory yield. Analysis gave 13.3% phosphorus and 14.3% chlorine as compared to 12.7% phosphorus and 14.5% chlorine calculated for $C_7H_{14}ClO_3PS$. Infrared analysis showed the presence of the P=O group.

Example 13

To a solution of 44.9 parts by weight (0.311 mole) of 1,2,3-trichloropropene in 150 ml. of acetone was added 140 parts by weight (0.32 mole) of ammonium O,O-bis(dichlorophenyl) phosphorodithioate. The reaction mixture was heated to refluxing temperature (65° C.) and held there for one hour. After standing overnight, the product was heated for one hour at 55–65° C., cooled and the acetone removed by stripping. The product was then washed with water, sodium hydroxide and again with water. Benzene was then added and the product stripped to 103° C./3 mm. The S-2,3-dichloroallyl O,O-bis(2,4-dichlorophenyl) phosphorodithioate so obtained was a dark brown viscous liquid analyzing 39.2% chlorine as compared to 40.2% calculated for $C_{15}H_{10}Cl_2O_2PS_2$.

An especially interesting property of some of the new compounds is systemic biological activity. For example, S-(2-chloroallyl) O,O-diethyl phosphorodithioate exerted excellent systemic fungicidal activity when applied at a concentration of 100 parts per million. The compounds also comprise systemic insecticides.

As illustrative of the insecticidal activity aqueous emulsions containing the new compounds in concentrations hereinafter indicated were employed for dipping thereinto infested leaves of plants. Contact effects were observed on the infested leaves. On the dipped infested plants 100% kill of mobile stages of the two-spotted mite was obtained by dipping the infested plant in an emulsion of 0.1% concentration of either 3,3-dichloroallyl O,O-diethyl phosphorothioate or S-(3,3-dichloroallyl) O,O-dimethyl phosphorodithioate.

The new compounds were tested as systemic insecticides by immersing excised stems of bean plants in emulsions of the chemicals for three days. The leaves were then cut off, infested with the chosen insect and the percent kill noted after 48 hours. Tested against Mexican bean beetle larvae, emulsions containing 0.004% of 3,3-dichloroallyl O,O-diethyl phosphorothioate killed 100% of the insects.

The new compounds are useful for destroying a variety of insect pests by contacting the insect in its environment either directly or indirectly through translocation within the plant. The compounds may be applied in solution, emulsion, water dispersion or as a dust formulation wherein the active ingredient is distributed over a dry free flowing powder, as for example clays, including bentonite, and attapulgite or such materials as talc, diatomaceous earth, fuller's earth, chalk or calcium carbonate. The required concentrations of active ingredients are small because of the high effectiveness of the new compounds. Sprays for application to agricultural crops may suitably be applied at concentrations of 0.001–1.0%.

It is intended to cover all changes and modifications of the examples of the invention herein chosen for purposes of disclosure which do not constitute departures from the spirit and scope of the invention.

What is claimed is:
1. An O,O-di-(lower alkyl) phosphorothioate having the remaining valence satisfied by a halogen substituted 2-alkenyl group containing less than 5 carbon atoms, the halogen being attached to unsaturated carbon.

2. A compound of the structure

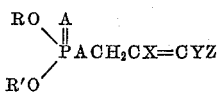

where R and R' are lower alkyl groups, A is selected from a group consisting of oxygen and sulfur, at least one of which is sulfur, X and Y are selected from a group consisting of hydrogen and halogen, at least one of which is halogen, and Z is selected from a group consisting of methyl, hydrogen and halogen.

3. 3,3-dichloroallyl O,O-diethyl phosphorothioate.
4. S-(3,3-dichloroallyl) O,O-dimethyl phosphorodithioate.
5. S-(2-chloroallyl) O,O-diethyl phosphorodithioate.
6. 2-chloroallyl O,O-diethyl phosphorothioate.
7. 2,3-dichloroallyl O,O-diethyl phosphorothioate.
8. A process for the manufacture of haloalkenylphosphorothioates which comprises condensing substantially equal molecular proportions of a polyhaloolefin having the structure

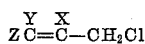

where X and Y are selected from a group consisting of hydrogen and halogen, at least one of which is halogen, and Z is selected from a group consisting of methyl, hydrogen and halogen with a salt of a phosphorothioic acid having the structure

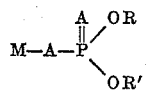

where M is selected from the group consisting of alkali metal and ammonia, A is selected from the group consisting of oxygen and sulfur at least one of which must be sulfur and R and R' represent lower alkyl groups, removing by-product MCl and recovering the product

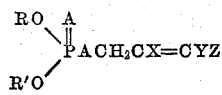

9. A pesticidal composition comprising a carrier and containing as an active component thereof a compound of the structure

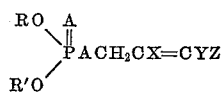

where R and R' are lower alkyl groups, A is selected from a group consisting of oxygen and sulfur, at least one of which is sulfur, X and Y are selected from a group consisting of hydrogen and halogen, at least one of which is halogen and Z is selected from a group consisting of methyl, hydrogen and halogen.

10. A method of protecting plants from pests which comprises treating the plant with a composition containing as an essential active ingredient a compound of the structure

where R and R' are lower alkyl groups, A is selected from a group consisting of oxygen and sulfur, at least one of which is sulfur, X and Y are selected from a group consisting of hydrogen and halogen, at least one of which is halogen and Z is selected from a group consisting of methyl, hydrogen and halogen.

References Cited in the file of this patent
UNITED STATES PATENTS

| | | |
|---|---|---|
| 2,589,326 | Oberright | Mar. 18, 1952 |
| 2,744,128 | Morris | May 1, 1956 |
| 2,765,331 | Whetstone et al. | Oct. 2, 1956 |

FOREIGN PATENTS

| | | |
|---|---|---|
| 78,252 | Netherlands | June 15, 1955 |

OTHER REFERENCES

Reinhardt, R. M.: "J. Am. Chem. Soc." 74, p. 1093–4 (1952).
Corey et al.: "Science," vol. 118, pp. 28–29, July 1953.
Perkow: "Chem. Berichte," vol. 87, pp. 755–758 (1954).